Nov. 20, 1962 J. J. SAYKAY 3,065,298
CODING APPARATUS
Filed June 5, 1961
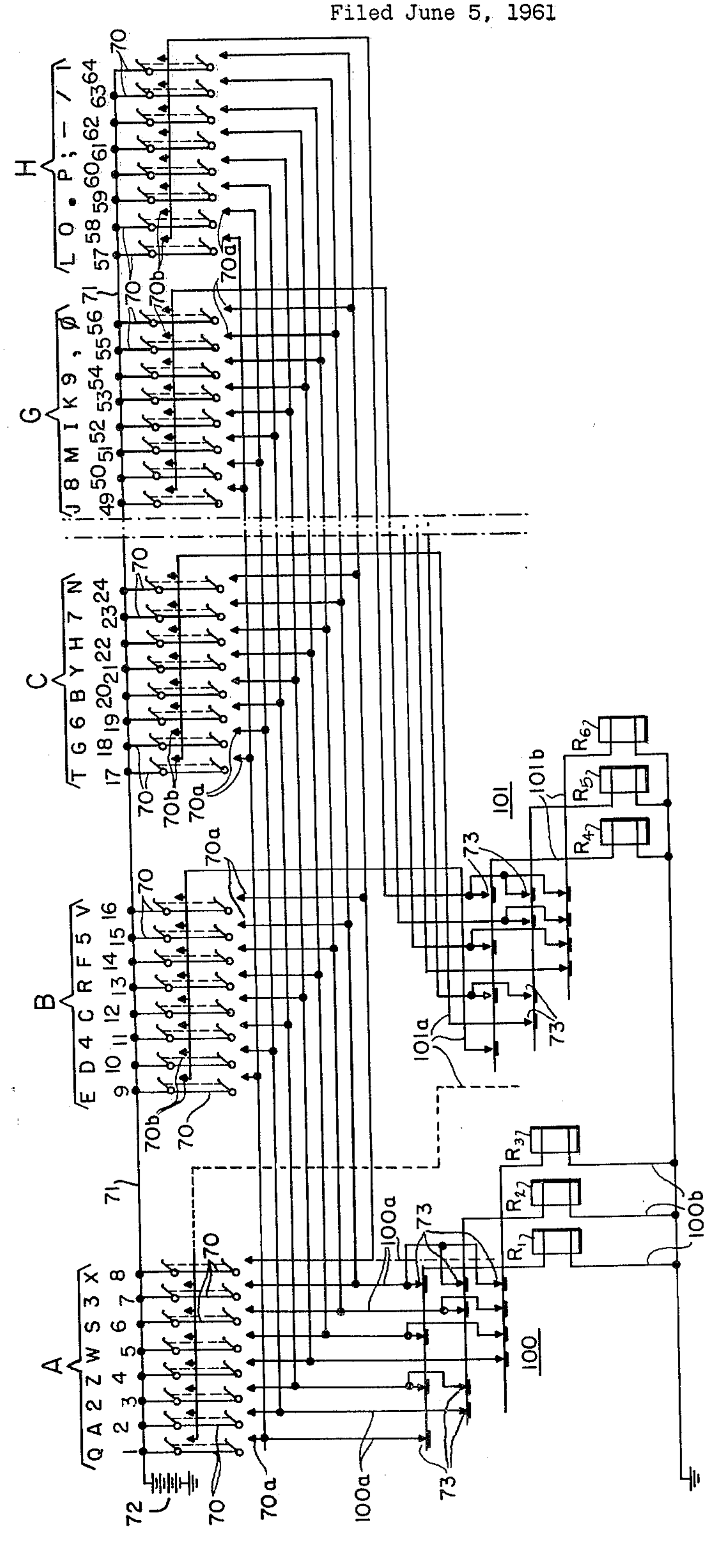

United States Patent Office 3,065,298
Patented Nov. 20, 1962

3,065,298

CODING APPARATUS

Joseph John Saykay, Sea Cliff, N.Y., assignor to Fairchild Camera and Instrument Corporation, a corporation of Delaware Filed June 5, 1961, Ser. No. 114,776
4 Claims. (Cl. 178—79)

This invention relates to coding apparatus and, while it is of general application, it is particularly suitable for translating information developed by a key-operated machine, for example a typewriter, into coded information suitable for storage or transmission and will be specifically described in such an application.

A common application of such coding apparatus is to an ordinary typewriter in order to produce a code-punched tape output suitable for operating automatic devices, such as an automatic typesetting machine. One form of coding apparatus suitable for such an application is described and claimed in applicant's prior Patent 2,859,276. However, such an automatic typesetting machine requires the encoding not only of alpha-numeric information but also information as to type widths in increments of 0.001 inch up to 0.255 inch and, in addition, certain operating instructions to the machine. To translate all of such information would require an 8-unit code for which the conventional code matrix, for example that of aforesaid Patent 2,859,276, would require a total of 384 diodes or equivalent matrix elements. Not only is such a matrix complex, bulky, and costly but, in addition, it results in the connection of a large number of diode elements or equivalent in parallel. While, ideally, such devices are unidirectionally conductive, in practice there is a small reverse leakage current and, when a sufficiently large number of these devices are connected in parallel, the sum of such reverse currents may become sufficient to energize connected load devices improperly.

It is an object of the invention, therefore, to provide a new and improved coding apparatus utilizing a very much smaller number of matrix coding elements than heretofore required in such coding apparatus.

It is another object of the invention to provide a new and improved coding apparatus in which the sum of the leakage currents of all unidirectionally conductive elements in parallel is insufficient to cause faulty operation of the apparatus.

In accordance with the invention, a coding apparatus comprises a plurality of $m$-contact switches, such switches comprising $n$ groups of $o$ switches each, where $m$, $n$, and $o$ are selected integers other than 1, a common input conductor connected to an input contact of each of the switches, and $m$ code matrices, each comprising $n-1$ input conductors and $p$ output conductors, where $p$ is selected to satisfy the relation: $n \cdot o = 2^{m \cdot p}$. Each of the input conductors of one of the $m$ matrices is connected to a corresponding contact of a corresponding switch of each of the $n$ groups of switches and each of the input conductors of each of the other of the $m$ matrices is connected to different corresponding contacts of all the switches of one of the groups of switches, while unidirectionally conductive devices interconnect selected ones of the matrix input and output conductors in accordance with a predetermined code, and a control device is included in each of the output conductors. The term "$m$-contact switches" is intended to refer to switches having $m$ output contact elements and one or more input contact elements.

For a better understanding of the present invention, together with other and further objects thereof, reference is had to the following description taken in connection with the accompanying drawing, while its scope will be pointed out in the appended claims.

Referring now to the drawing, the single FIGURE is a schematic representation of a coding apparatus embodying the invention.

Referring now specifically to the drawing, there is represented a coding apparatus comprising a plurality $k$ of $m$-contact switches. These switches are arranged in $n$ groups of $o$ switches each, where $m$, $n$, and $o$ are selected integers other than 1, and satisfy the relation $k = n \cdot o$. Specifically, there are provided 64 two-contact switches arranged in eight groups, A–H, inclusive, of eight switches each so that the parameters $n$ and $o$ both have the value 8.

The switches 1–64, inclusive, have input contact elements 70 connected to a common input conductor 71 adapted to be energized from a suitable source, represented as a battery 72. The input contact element 70 of each of the switches 1–64, inclusive, includes a pair of movable contact elements interconnected, as indicated by dotted lines, for operation in unison by its associated character key to make contact individually with associated fixed contact elements 70*a* and 70*b*.

The coding apparatus of the invention further includes $m$ code matrices each comprising $n$ input conductors and $p$ output conductors, where $p$ is selected to satisfy the relation $n \cdot o = 2^{m \cdot p}$. Specifically, there are provided two code matrices 100 and 101, the code matrix 100 having eight input conductors 100*a* and three output conductors 100*b*. Similarly, the matrix 101 has eight input conductors 101*a* and three output conductors 101*b*. Control devices, such as the solenoids or relays $R_1$–$R_6$, are individually included in the output conductors 100*b*, 101*b*.

Each of the input conductors of one of the matrices 100, 101 is connected to a corresponding contact of a corresponding switch of each of the groups of switches, while each of the input conductors of the other of such matrices is connected to different corresponding contacts of all of the switches of one of the groups of switches. Specifically, each of the input conductors 100*a* of the matrix 100 is individually connected to the lower contact 70*a* of the corresponding switch in each of the groups of switches. On the other hand, each of the input conductors 101*a* of the matrix 101 is connected to the upper contacts 70*b* of all of the switches of one of the groups of switches.

The coding apparatus of the invention also includes a plurality of unidirectionally conductive devices, schematically represented as diodes 73, interconnecting selected ones of the input and output conductors of the matrices 100 and 101 in accordance with a predetermined code pattern. In the illustrated embodiment, the code patterns of the matrices 100 and 101 are the same. It is to be noted that the eighth input conductor 100*a* of the matrix 100, connected to the lower contacts of switches Nos. 8, 16, 24, etc., is not connected to any of the output conductors 100*b* through a matrix diode 73, as indicated by the dotted-line portion of this conductor. This is because these switches do not generate a code symbol requiring energization of any of the output conductors 100*b*. Similarly, it is to be noted that the first input conductor 101*a* of the matrix 101, connected to the upper contacts of the first group of switches, Nos. 1–8, is not connected to any of the output conductors 101*b* through a matrix diode 73, as indicated by the dotted-line portion of this conductor, because none of the switches Nos. 1–8, inclusive, generates a code symbol requiring the energization of any of the output conductors 101*b*. Hence, switches Nos. 1–8, inclusive, may be single-contact switches if desired. Thus, when referring to a matrix having $n$ input conductors, it is intended to include a matrix of the type described, even though one of the input conductors is inactive for a particular code pattern.

As shown in the drawing, each of the switches 1–64, inclusive, may be representative of a particular alphabetic, numerical, or symbolic character. Alternatively, the coding apparatus described may be utilized as counter to encode the widths of the various type characters. In this case, the control devices $R_1$–$R_6$, inclusive, are assigned binary values 2, 4, 8, etc., and are thus effective to count in increments of two from 2 to 256. While, in the operation of automatic line-casing machines using such width information, it is customary to provide widths in increments of 0.001 inch, it has been found that by decreasing the width information by 0.001 for all values below 0.128 and increasing the width information for all values between 0.128 and 0.256 inch, the errors introduced by omitting the odd widths will approximately average out over an entire line.

When the control devices $R_1$–$R_6$, inclusive, are used for supplying width information as described, they may be used to operate a counting mechanism of the type illustrated and described in the article entitled "Slipping Clutches Drive, Regulate Variable Escapement" in Design News, November 15, 1957, in which the control devices $R_{1-6}$ (inclusive, may be employed as the actuating solenoids of the counting mechanism.

The coding apparatus of the invention has so far been described in the form of a division of the conventional single matrix into a symmetrical arrangement of submatrices. In some applications, the number of required code combinations may be less than $(2^{m \cdot p}-1)$ and it may be economical to utilize an unsymmetrical arrangement of submatrices; that is, some of the submatrices may have somewhat more than $k/n$ input conductors and others less. However, in such an arrangement, each of the submatrices will have input conductors of the order of $k/n$ and not more than $p$ output conductors. In this case, the total number $k$ of switches will be less than $2^{m \cdot p}$.

The coding apparatus of the invention has been specifically described as embodied in an arrangement for developing sixty-three $(2^{m \cdot p}-1)$ code combinations and it will be seen requires only twenty-four matrix diodes or equivalent unilaterally conductive devices, as contrasted to sixty-four diodes required by the conventional single matrix. However, the invention may be extended to other coding systems for developing different numbers of code combinations in which the minimum number of required diodes is utilized. The essential parameters of a number of such coding systems, including matrices each having eight input conductors, is shown in the following table which, it is seen, represents a very considerable reduction from the number required in the conventional single matrix, namely, the number equal to the number of code combinations plus 1. However, the invention is of application also to coding systems in which the matrices have various numbers of input and output conductors.

| Number of code combinations | Number of matrices | Number of input conductors each matrix | Number of output conductors each matrix | Minimum number of matrix elements |
|---|---|---|---|---|
| $2^4-1=15$ | 2 | 8 | 1-3 | 13 |
| $2^5-1=31$ | 2 | 8 | 2-3 | 16 |
| $2^6-1=63$ | 2 | 8 | 3-3 | 24 |
| $2^7-1=127$ | 3 | 8 | 3-3-1 | 25 |
| $2^8-1=255$ | 3 | 8 | 3-3-2 | 28 |
| $2^9-1=511$ | 3 | 8 | 3-3-3 | 36 |

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A coding apparatus comprising: a plurality of $m$-contact switches, said switches comprising $n$ groups of $o$ switches each, where $m$, $n$, and $o$ are selected integers other than 1; a common input conductor connected to an input contact of each of said switches; $m$ code matrices, each comprising $n$ input conductors and $p$ output conductors, where $p$ is selected to satisfy the relation: $n \cdot o = 2^{m \cdot p}$, each of the input conductors of one of said matrices being connected to a corresponding contact of a corresponding switch of each of said groups of switches and each of the input conductors of each of the other of said matrices being connected to different corresponding contacts of all the switches of one of said groups of switches; unidirectionally conductive devices interconnecting selected ones of said matrix input and output conductors in accordance with a predetermined code; and a control device included in each of said output conductors.

2. A coding apparatus comprising: a plurality of two-contact switches, said switches comprising $n$ groups of $o$ switches each, where $n$ and $o$ are selected integers other than 1; a common input conductor connected to an input contact of each of said switches; two code matrices, each comprising $n$ input conductors and $p$ output conductors, where $p$ is selected to satisfy the relation: $n \cdot o = 2^{2p}$, each of the input conductors of one of said matrices being connected to a corresponding contact of a corresponding switch of each of said groups of switches and each of the input conductors of the other of said matrices being connected to the other corresponding contacts of all of the switches of one of said groups of switches; unidirectionally conductive devices interconnecting selected ones of said matrix input and output conductors in accordance with a predetermined code; and a control device included in each of said output conductors.

3. A coding apparatus comprising: a plurality of two-contact switches, said switches comprising eight groups of eight switches each; a common input conductor connected to an input contact of each of said switches; two code matrices, each comprising eight input conductors and three output conductors, each of the input conductors of one of said matrices being connected to a corresponding contact of a corresponding switch of each of said groups of switches and each of the input conductors of the other of said matrices being connected to the other corresponding contacts of all of the switches of one of said groups of switches; unidirectionally conductive devices interconnecting selected ones of said matrix input and output conductors in accordance with a predetermined code; and a control device included in each of said output conductors.

4. A coding apparatus comprising: a plurality $k$ of $m$-contact switches, said switches comprising $n$ groups of switches, where $k$, $m$, and $n$ are selected integers other than 1; a common input conductor connected to an input contact of each of said switches; $m$ code matrices, each comprising of the order of $k/n$ input conductors and not more than $p$ output conductors; where $p$ is selected to satisfy the relation: $k < 2^{m \cdot p}$, each of the input conductors of one of said matrices being connected to a corresponding contact of a corresponding switch of each of said groups of switches and each of the input conductors of each of the other of said matrices being connected to different corresponding contacts of all of the switches of one of said groups of switches; unidirectionally conductive devices interconnecting selected ones of said matrix input and output conductors in accordance with a predetermined code; and a control device included in each of said output conductors.

No references cited.